UNITED STATES PATENT OFFICE.

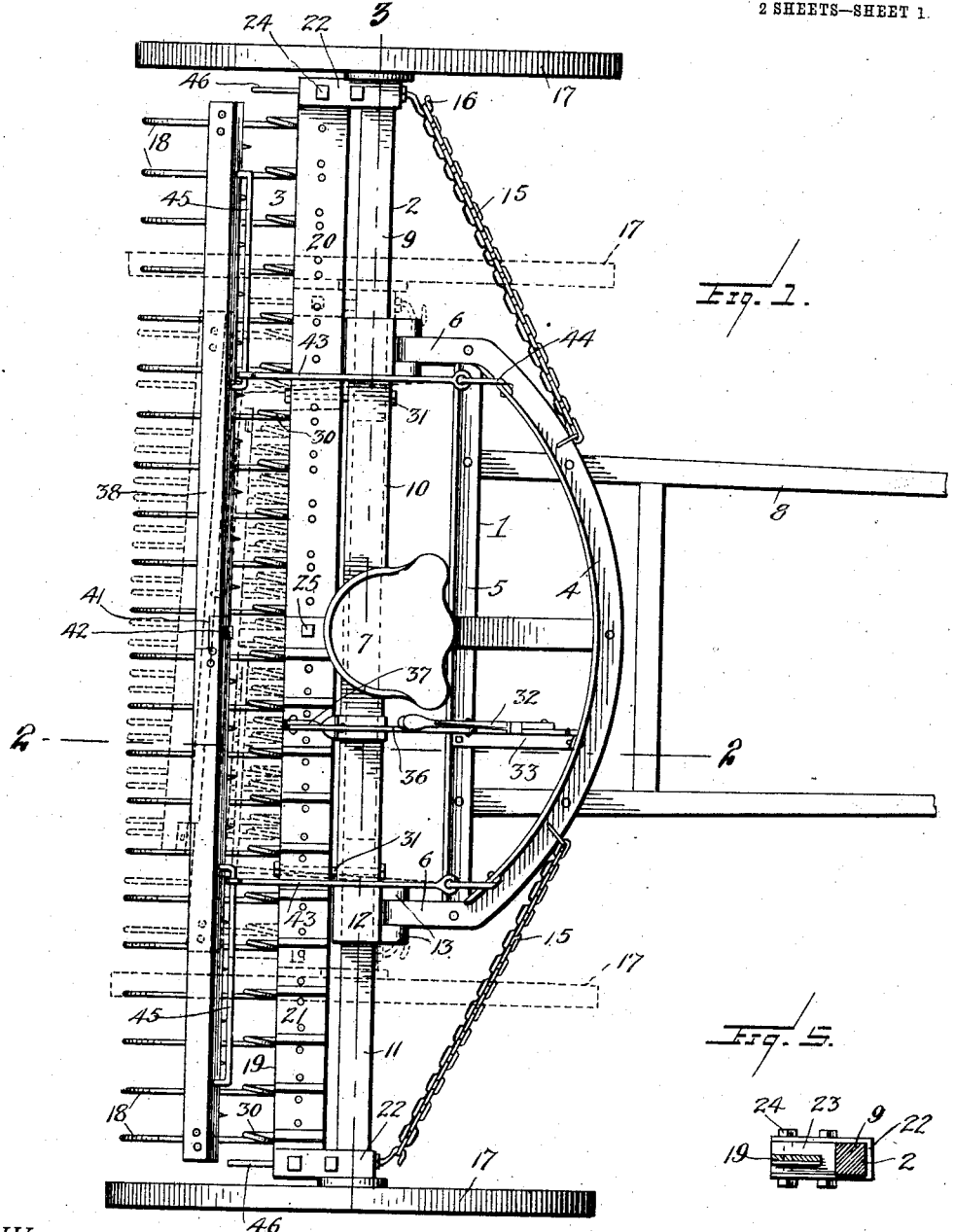
W. C. CLARK.
FOLDING SULKY HAY RAKE.
APPLICATION FILED SEPT. 23, 1907.
906,770.
Patented Dec. 15, 1908.
2 SHEETS—SHEET 1.

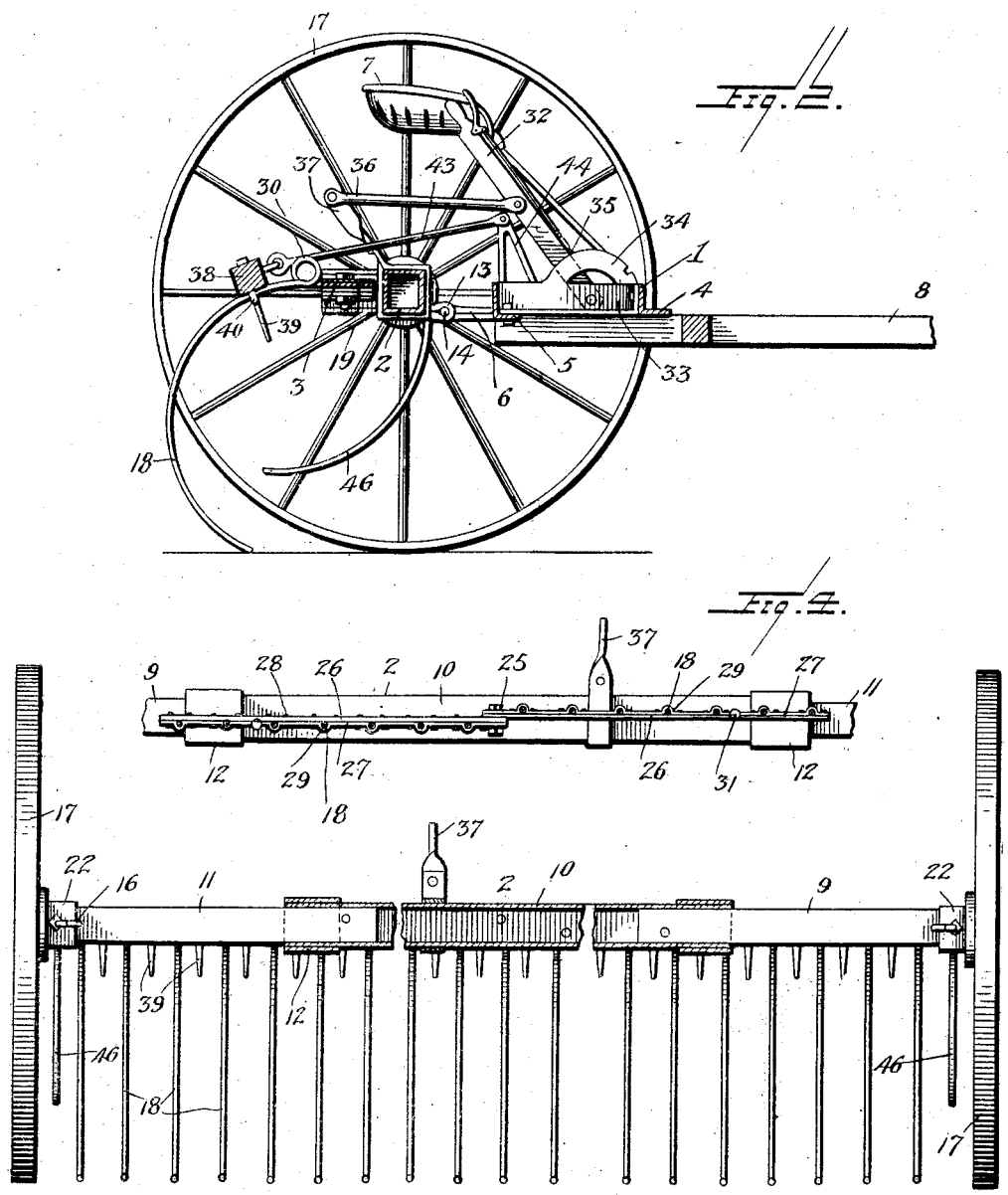

WINFIELD SCOTT CLARK, OF PENROD, KENTUCKY.

FOLDING SULKY HAY-RAKE.

No. 906,770.      Specification of Letters Patent.      Patented Dec. 15, 1908.

Application filed September 23, 1907. Serial No. 394,217.

*To all whom it may concern:*

Be it known that I, WINFIELD S. CLARK, a citizen of the United States, residing at Penrod, in the county of Muhlenberg and State of Kentucky, have invented certain new and useful Improvements in Folding Sulky Hay-Rakes, of which the following is a specification, reference being had to the accompanying drawings.

My invention relates to improvements in sulky hay rakes and more particularly one which when not in use may be readily folded or collapsed and made comparatively narrow so that it may be readily drawn over a road or through ordinary gate openings.

The object of the invention is to provide a rake of this character which will be simple, strong, durable and comparatively inexpensive in construction and which may be quickly and conveniently extended for use and folded or shortened for transportation or storage.

With the above and other objects in view, my invention consists of the novel features of construction and the combination and arrangement of parts hereinafter described and claimed, and illustrated in the accompanying drawings in which Figure 1 is a top plan view of my improved folding sulky hay rake showing it extended in full lines and folded or collapsed in dotted lines; Figs. 2 and 3 are detail sectional views taken respectively on the planes indicated by the lines 2—2 and 3—3 in Fig. 1; Fig. 4 is a detail transverse section through one of the sections of the axle showing the manner in which one of the tooth bar sections is attached to it; and Fig. 5 is a detail transverse section through one of the end sections of the axle and one of the sections of the rake bar.

My improved hay rake comprises a main frame 1 having hingedly connected to its rear portion an axle 2 which carries a rake 3. The frame 1 is preferably constructed of angle metal and consists of front and rear bars 4, 5 the latter of which is straight and the former of which is longitudinally curved and provided with rearwardly extending parallel ends or arms 6 secured to the ends of the bar 5. Upon the frame 1 is mounted a driver's seat 7 which is attached to the usual seat spring, and also attached to said frame is a pair of shafts 8 for the draft-animal.

The axle 2 is so constructed that it may be lengthened and shortened, and it is preferably composed of three sections 9, 10, 11. The central section 10 is hollow or tubular and of square or other polygonal form in cross section while the end sections 9, 11 have a similar cross sectional shape and are adapted to telescope into the ends of the central section. The ends of the section 10 of the axle are reinforced by surrounding collars 12 from which project spaced lugs 13 to receive the arms 6 of the main frame and pivots 14 which serve to pivotally or hingedly connect the axle to the main frame. The end sections 9, 11 of the axle are adapted to slide freely in the central section 10 and their outward movement is preferably limited by chains or the like 15 which have their inner ends attached to the main frame and their outer ends detachably engaged with hooks 16 arranged adjacent to the outer ends of the axle sections 9, 11. Upon the outer ends of said axle sections are suitably journaled supporting wheels 17.

The rake 3 comprises a plurality of spring teeth 18 and a tooth bar or member 19, and it is also made in sections so that it may be lengthened or shortened. I preferably construct it of two similar half sections by making the bar or member 19 in two sections 20, 21 each of which has its outer end rigidly connected to one of the end sections of the axle by a U-shape strap 22, a spacing block 23 and bolts or similar fastenings 24 as clearly shown in Fig. 5. The inner ends of the two sections of the tooth bar are adapted to slidably engage each other as seen in Fig. 4 and when in their extended position they are adapted to be rigidly connected together by a bolt or other removable fastening 25. Each of the rake bar sections 20, 21 consists of two plates or strips 26, 27 united by rivets 28. The plates 26 of the two sections are adapted to slidably engage each other and in the plates 27 are formed seats 29 for the inner ends of the rake teeth 18. These teeth are constructed of resilient metal rods and they are curved longitudinally so that they are of substantially semi-circular form as shown in Fig. 2. To increase their resiliency they are preferably formed with coils 30 located adjacent to their inner or upper ends which are clamped in the sockets 29. In order to more effectively attach the tooth bar 19 to the axle when both the bar and axle are extended as shown in Fig. 1 I preferably employ bolts or other removable fastenings 31 which are passed through alined apertures or openings in the axle section 10 and the two sections of the rake bar as shown in said Fig. 1. It will be noted that these bolts 31 in connection with the clips or straps 22 provide a substantial connection between the axle and rake so that the two will be rigidly united.

For the purpose of dumping the rake I provide means for rotating the axle 2 in a forward direction and thereby lifting the rake fingers. This means comprises a hand lever 32 pivoted to a plate 33 which connects the bars 4, 5 of the main frame and serves as a brace for the same and which is also formed with a segmental portion 34 having a notch or seat for the reception of the usual spring projected and hand retracted dog or pawl 35 upon the lever. Said lever is connected by a link 36 to an arm 37 projecting outwardly and rearwardly from the central portion of the axle as seen in Fig. 2. When the parts are in the position shown in said figure the rake will be in its lowered operative position but when the hand lever is swung forwardly the axle will be rotated to raise the rake. The rake is retained in its elevated position by the engagement of the dog 35 with the seat in the segment 34.

In order to clear the rake teeth of the hay or the like as they are raised to their dumping position, I provide a clearing member 38 consisting of a bar arranged above the rake teeth and provided with fingers 39 to project downwardly between said teeth. The clearing bar 38 is provided upon its lower face with eyes 40 through which certain of the teeth 18 project and in which they are adapted to slide as they are elevated. These eyes 40 prevent the bar 38 from having an endwise movement with respect to the rake teeth and in order to enable the rake to be shortened I make said bar in two sections as shown in Fig. 1. These half sections of the clearing bar 38 have their inner ends notched to engage each other as shown at 41. They are adapted to be secured together by a bolt 42 or any other removable fastening when they are in their extended position. Said bar 38 is supported by links 43 connected at their forward ends to brackets 44 upon the main frame and having their rear ends formed with eyes to slidably engage brackets 45 upon the sections of the clearing bar 38. By making the brackets 45 comparatively long as shown in Fig. 1 and allowing the links 43 to slide upon them, the half sections of said bar 38 are permitted to move inwardly when the rake is shortened.

In order to prevent the hay from being caught by the supporting wheel 17 and twisted around the axle and the spokes I preferably provide curved guard fingers 46. One of these fingers is arranged upon the inner side of each of the wheels 17 and has its upper end rigidly connected to the end sections of the axle as shown. Said guard fingers extend downwardly and rearwardly from the axle and serve to deflect the straw or the like being raked as will be readily understood upon reference to Fig. 2.

The construction, operation and advantages of the invention will be readily understood from the foregoing description taken in connection with the accompanying drawings. It will be seen that when the axle and rake are extended the device will rake a comparatively broad strip of the field and that when said parts are collapsed or folded as shown in dotted lines in Fig. 1 the device will be comparatively narrow so that it may be drawn over a comparatively narrow road and through a comparatively small gate opening.

Owing to the construction of the several parts of the device it may be quickly and easily extended for use or shortened for transportation or storage. It is also strong and durable and not liable to be readily broken or damaged.

While I have shown and described the preferred embodiment of the invention it will be understood that I do not wish to be limited to the precise construction set forth, and that various changes in the form, proportion and minor details may be resorted to without departing from the spirit or sacrificing any of the advantages of the invention.

Having thus described my invention what I claim is:

1. In a rake, the combination with a main frame, of an axle having a central section hingedly connected to the main frame and end sections slidably engaged with the central section, supporting wheels upon said end sections, an extensible rake having slidably engaged sections connected to the end sections of the axle, a detachable connection between the inner portions of the rake sections and the central section of the axle and means for rotating the axle to elevate the rake.

2. In a rake, the combination with a rake bar having extensible sections, of an extensible clearing bar having sections connected to the sections of the rake bar and adapted to be extended simultaneously therewith.

3. In a rake, the combination with a main frame, of an axle hingedly connected thereto and carrying supporting wheels, a rake connected to the axle, means for rotating the axle to raise and lower the rake, a clearing bar slidably engaged with the rake teeth and having teeth to project between the same, and a link connection between the main frame and said bar.

4. In a rake, the combination with a main frame, of supporting wheels, and guard fingers curved downwardly and rearwardly and arranged adjacent to said supporting wheels to deflect the hay away from the same, substantially as set forth.

5. In a rake, the combination with a main frame, of extensible axles thereon, an extensible rake bar having two sections rigidly secured at their outer ends to the axles and having their inner ends overlapping and slidably engaged and an extensible clearing bar having two sections one of the latter being carried by each of the sections of the rake.

6. In a rake, the combination with a main frame, of extensible axles thereon, an extensible rake bar having two sections secured at their outer ends to the axles and having their inner ends overlapping and slidably engaged, an extensible clearing bar having sections carried by the sections of the rake, longitudinal brackets upon the sections of the clearing bar, links connected to the main frame and slidably engaged with said brackets and means for elevating the rake bar.

7. In a rake, the combination with a main frame, of a rake having slidably engaged extensible sections, means for raising and lowering the rake, an extensible clearing bar having its sections carried by the sections of the rake, longitudinal brackets upon the sections of the clearing bar and links connected to the main frame and slidably engaged with said brackets.

8. In a rake, the combination with a main frame, of an extensible axle, an extensible rake bar having sections connected to said extensible axle and a flexible connection between the axle and the main frame to limit the outward movement of the axle and to brace the same.

9. In a rake, the combination with an extensible supporting frame, of an extensible rake bar having slidably engaged sections, each section consisting of a flat member and a member formed with recesses or seats, the two flat members of the two sections being adapted to slidably engage each other, and tines arranged in said recesses or seats in said members.

In testimony whereof I hereunto affix my signature in the presence of two witnesses.

WINFIELD SCOTT CLARK.

Witnesses:
C. R. DEPOYSTER,
SAM HARRIS.